(12) United States Patent
Li et al.

(10) Patent No.: US 11,239,469 B2
(45) Date of Patent: Feb. 1, 2022

(54) PRE-LITHIATION OF ANODES FOR HIGH PERFORMANCE CAPACITOR ASSISTED BATTERY

(71) Applicant: GM GLOBAL TECHNOLOGY OPERATIONS LLC, Detroit, MI (US)

(72) Inventors: Zhe Li, Shanghai (CN); Xiaochao Que, Shanghai (CN); Haijing Liu, Shanghai (CN); Jingjing Wu, Shanghai (CN); Dave G. Rich, Sterling Heights, MI (US); Saad Hasan, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 549 days.

(21) Appl. No.: 15/995,580

(22) Filed: Jun. 1, 2018

(65) Prior Publication Data
US 2019/0372127 A1    Dec. 5, 2019

(51) Int. Cl.
*H01M 4/80* (2006.01)
*H01M 10/0525* (2010.01)
(Continued)

(52) U.S. Cl.
CPC .............. *H01M 4/80* (2013.01); *H01G 11/06* (2013.01); *H01M 10/056* (2013.01); *H01M 10/0525* (2013.01)

(58) Field of Classification Search
None
See application file for complete search history.

(56) References Cited

U.S. PATENT DOCUMENTS

| 10,297,885 | B2 | 5/2019 | Gayden et al. |
| 10,597,783 | B2 | 3/2020 | Liu et al. |

(Continued)

FOREIGN PATENT DOCUMENTS

| CN | 110556611 A | 12/2019 |
| DE | 102019111689 A1 | 12/2019 |
| WO | 2019204964 A1 | 10/2019 |

OTHER PUBLICATIONS

Li, Zhe et al., U.S. Appl. No. 17/047,198, filed Oct. 13, 2020 entitled, "Incorporation of Lithium-Ion Source Material Into an Activated Carbon Electrode for a Capacitor-Assisted Battery," 26 pages.

*Primary Examiner* — Robert S Carrico
(74) *Attorney, Agent, or Firm* — Harness, Dickey & Pierce, P.L.C.

(57) ABSTRACT

A hybrid lithium-ion battery/capacitor cell comprising at least a pair of graphite anodes assembled with a lithium compound cathode and an activated carbon capacitor electrode can provide useful power performance properties and low temperature properties required for many power utilizing applications. The graphite anodes are formed of porous layers of graphite particles bonded to at least one side of current collector foils which face opposite sides of the activated carbon capacitor. The porous graphite particles are pre-lithiated to form a solid electrolyte interface on the anode particles before the anodes are assembled in the hybrid cell. The pre-lithiation step is conducted to circumvent the irreversible reactions in the formation of a solid electrolyte interface (SEI) and preserve the lithium content of the electrolyte and lithium cathode during formation cycling of the assembled hybrid cell. The pre-lithiation step is also applicable to other anode materials that benefit from such pre-lithiation.

15 Claims, 2 Drawing Sheets

(51) Int. Cl.
 *H01G 11/06* (2013.01)
 *H01M 10/056* (2010.01)

(56) References Cited

U.S. PATENT DOCUMENTS

| | | | |
|---|---|---|---|
| 10,693,176 | B2 | 6/2020 | Liu et al. |
| 10,826,139 | B2 | 11/2020 | Rich et al. |
| 2009/0029257 | A1* | 1/2009 | Ando ............... H01G 9/016 |
| | | | 429/231.95 |
| 2010/0255356 | A1* | 10/2010 | Fujii ............... H01M 12/005 |
| | | | 429/94 |
| 2016/0141596 | A1* | 5/2016 | Uhm ............... H01M 4/587 |
| | | | 429/220 |
| 2016/0285137 | A1* | 9/2016 | Gayden ............ H01M 10/4264 |
| 2019/0061555 | A1 | 2/2019 | Liu et al. |
| 2019/0067754 | A1 | 2/2019 | Gu et al. |
| 2019/0157659 | A1 | 5/2019 | Liu et al. |
| 2019/0341648 | A1 | 11/2019 | Wu et al. |
| 2019/0372186 | A1 | 12/2019 | Kong et al. |
| 2020/0118770 | A1 | 4/2020 | Liu et al. |
| 2020/0173028 | A1 | 6/2020 | Liu et al. |
| 2020/0321648 | A1 | 10/2020 | Liu et al. |
| 2021/0125791 | A1 | 4/2021 | Li et al. |

\* cited by examiner

PRE-LITHIATION OF ANODES FOR HIGH PERFORMANCE CAPACITOR ASSISTED BATTERY

TECHNICAL FIELD

This disclosure pertains to the pre-lithiation of graphite anodes for assembly into hybrid lithium-ion battery/capacitor cells comprising one or more graphite anodes, a capacitor cathode and a lithium-ion battery cathode. The practice is also applicable to other anode compositions that may benefit from pre-lithiation.

BACKGROUND

Background statements in this section are not necessarily prior art. There is increasing interest in the development of hybrid electrochemical cells which contain lithium-ion battery electrodes used in combination with a capacitor electrode in which the capacitor material is activated carbon particles. For example, such a hybrid cell might be formed with a pair of electrically-connected, negatively-charged (during cell-discharge) graphite-particle anode members and a cathode member electrically-connected with a positively-charged capacitor using activated carbon as its active capacitor material.

It is contemplated that such a hybrid cell and others, with other groupings of assembled battery electrodes and capacitor electrode(s), could be prepared with electrode compositions and amounts that could provide a range of battery/capacitor properties including different, useful combinations of energy densities (Wh/kg) and power densities (W/kg) in a hybrid electrochemical cell that adapt the hybrid cell's use in different applications.

In such hybrid cells, for example, in which two graphite anode electrodes, a suitable lithium transition-metal oxide cathode (e.g., lithium iron phosphate, $LiFePO_4$), and an activated carbon capacitor cathode(s) are physically spaced by porous separators and infiltrated with a non-aqueous solution of a lithium compound (e.g., $LiPF_6$), it is necessary to initially incorporate lithium into the graphite material of the two anodes that face toward the activated carbon capacitor electrode.

It is an object of this disclosure to provide practices for the preliminary introduction of lithium into particles of graphite anode material to prepare them for their function adjacent to an activated carbon capacitor in such hybrid cells.

SUMMARY

As an illustrative, non-limiting example, a hybrid lithium-ion battery/capacitor cell may contain as few as four electrodes. In this example, two electrically-connected, negatively-charged (during cell discharge) graphite anodes are assembled with a cathode of suitable lithium-containing composition (e.g., lithium iron phosphate, $LiFePO_4$) which is electrically connected to an activated carbon capacitor cathode. The graphite anodes are typically placed on opposing sides of the activated carbon capacitor cathode. Activated carbon particles are commercially available, and such carbon particles are prepared with high levels of porosity which enable them to adsorb and desorb suitable ions during their capacitor function in the hybrid electrochemical cell. This basic four-member hybrid cell may be combined with other groups of battery electrodes or with like hybrid cells.

Each of the respective electrodes is typically formed of particles of the selected electrode material, mixed with a small proportion of electrically-conductive carbon particles, and resin-bonded as a thin porous layer (e.g., up to about 150 μm in thickness) to one or both sides of a compatible current collector foil (e.g., an aluminum or copper foil, about 4 μm to 25 μm in thickness). The shapes of the electrodes in an assembled cell are often round or rectangular so that they can be stacked with interposed porous separators in the assembly of each electrochemical cell. Sometimes the electrodes are formed as relatively long rectangular strips which are assembled in layers with interposed separator strips and wound into circular or rounded-edge discs in the assembly of the cell. The closely-spaced, assembled electrodes are placed in a suitable container and infiltrated with a non-aqueous liquid solution of a suitable lithium electrolyte compound, such as lithium hexafluorophosphate, $LiPF_6$, dissolved in a mixture of liquid alkylene carbonates. The anode electrodes are electrically connected (typically using uncoated tabs on their current collectors) and the cathode and capacitor electrodes are likewise, separately connected. The tabs or other connectors will be connected to other electrodes or cells and/or an external circuit in the charging and discharging of the hybrid cell.

Traditionally, the formation process of a newly assembled cell has been conducted by application of a charging-current to the electrically-connected graphite anodes and the connected lithium-containing composition cathode in the just-assembled cell with its liquid electrolyte. During this initial charging step, solvated lithium ions intercalate into the graphite particles of the anodes. Decomposition of intercalated solvated materials and solvent molecules occurs and a solid electrolyte interface (SEI) is then formed on the anode particles. The SEI formation process irreversibly consumes lithium ions from the electrolyte and the lithium cathode. However, this formed SEI can function as a passivation layer that suppresses the sustained decomposition of electrolyte components. During continued charging, the de-solvation of $Li^+$ ions takes place at the SEI, and the SEI safeguards the reversible and stable $Li^+$-intercalation into graphite to form the graphite intercalation compound (GIC). Therefore, the SEI is regarded as being vital for subsequent de-intercalation and intercalation of lithium ions with the graphite anodes. Different from the conventional lithium-ion battery unit (for example, graphite anode/$LiFePO_4$ cathode), the $Li^+$ consumption at the graphite anode in the lithium-ion capacitor (LIC) unit (graphite anode/activated carbon cathode) of the hybrid cell can only come from the electrolyte owing to the absence of any lithium content in activated carbon, and the capacity mismatch between the graphite anode and the activated carbon cathode is large. As a result, initial irreversible consumption of lithium ions in the subject hybrid cell would decrease LIC capacity that can be delivered and have a negative influence on subsequent cell performance.

In accordance with practices of this disclosure, selected, newly-formed graphite anodes to be assembled adjoining an activated carbon capacitor cathode in a hybrid cell are processed by a suitable pre-lithiation process such that the graphite particles of the anode members contain effective solid electrolyte interfaces on their surfaces. The anodes contain porous layers of pre-lithiated graphite particles, resin bonded to one or both sides of a suitably shaped current collector foil and are ready for placement facing a side of a like-shaped capacitor electrode, characterized by a porous layer of activated carbon particles bonded to its current collector foil. In this practice, the pre-lithiated graphite anodes, located adjacent to capacitor cathodes, do not need to irreversibly consume additional lithium ions from other cell members or electrolyte molecules as part of a cell formation process.

In following sections of the specification, several methods for the pre-lithiation of graphite anodes are disclosed.

It is also recognized that other anode compositions, for hybrid lithium-ion battery/capacitor cells, that are not initially pre-treated by any lithiation, may also benefit from pre-lithiation practices described in this specification. Such anode material compositions include particles of silicon (Si), silicon mixed with graphite, suitable carbon particles (soft carbon, hard carbon and the like), silicon oxides ($SiO_x$, $0<x<2$), transition metals (e.g., tin), metal oxides such as $SnO_2$ and $TiO_2$, and other suitable lithium-accepting anode materials. Such materials have been used or considered for use as anode materials for lithium-ion cells and have required lithiation as an initial process in a newly assembled cell.

Other objects and advantages of the invention are disclosed in the following drawings and description of preferred embodiments.

Figure 1:
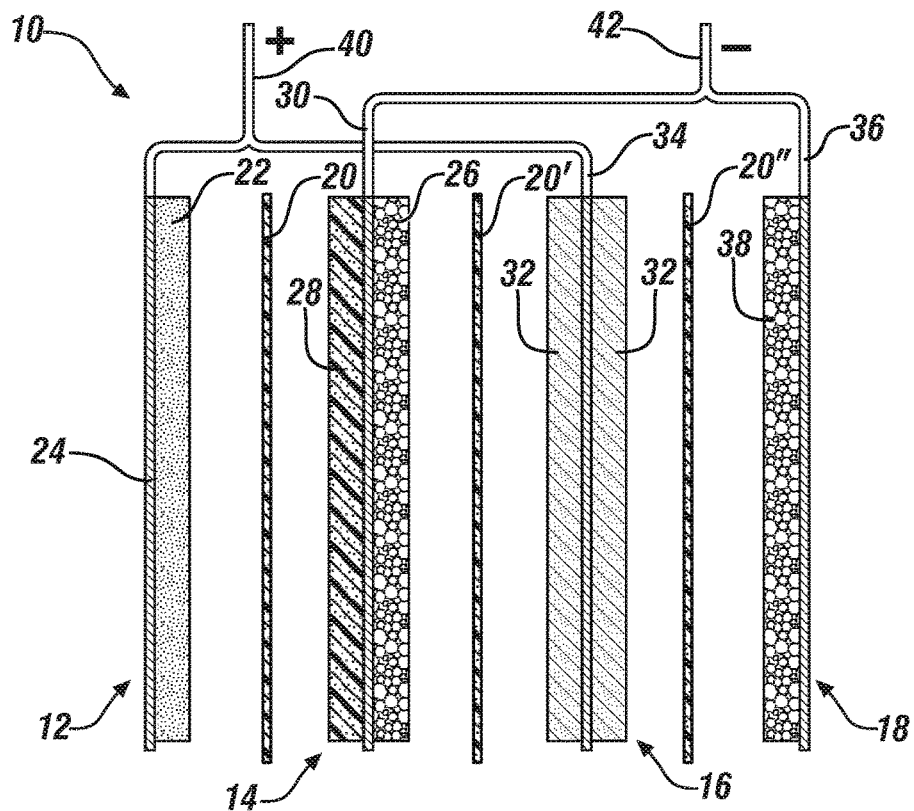
FIG. 1 is a schematic cross-sectional view of the side edges of a basic four electrode, hybrid lithium-ion battery/lithium-ion capacitor cell. The hybrid cell is illustrated in its just-assembled state, before it has been subjected to formation cycling. In the schematic figure, a pair of vertically-oriented, rectangular-shaped, electrically-connected, negatively-charged, pre-lithiated graphite anodes are assembled with like-sized, shaped and vertically-positioned combination of a lithium iron phosphate (LFP) cathode and an activated carbon capacitor cathode. The LFP cathode and capacitor cathode are electrically connected and positively charged. In the hybrid cell assembly of FIG. 1, the capacitor cathode is positioned between facing, electrode-material-coated surfaces of the graphite anodes and the LFP cathode is positioned on the opposite side of one of the anodes. The facing porous, resin-bonded layers of the graphite anode particles have been pre-lithiated. A like-sized and shaped, thin porous polymeric separator is placed between adjacent electrodes in the assembled hybrid cell to physically separate them. The four electrodes and three separators are spaced apart in the illustration of FIG. 1 for purposes of simpler illustration of the respective electrodes.

In a fully assembled cell, the four electrodes and their separators would be in stacked, touching contact, and the assembly would be placed in a container and infiltrated with a liquid electrolyte. Only the electrodes and separators are illustrated in FIG. 1 to more easily illustrate their cross-sectional structures.

Figure 2:
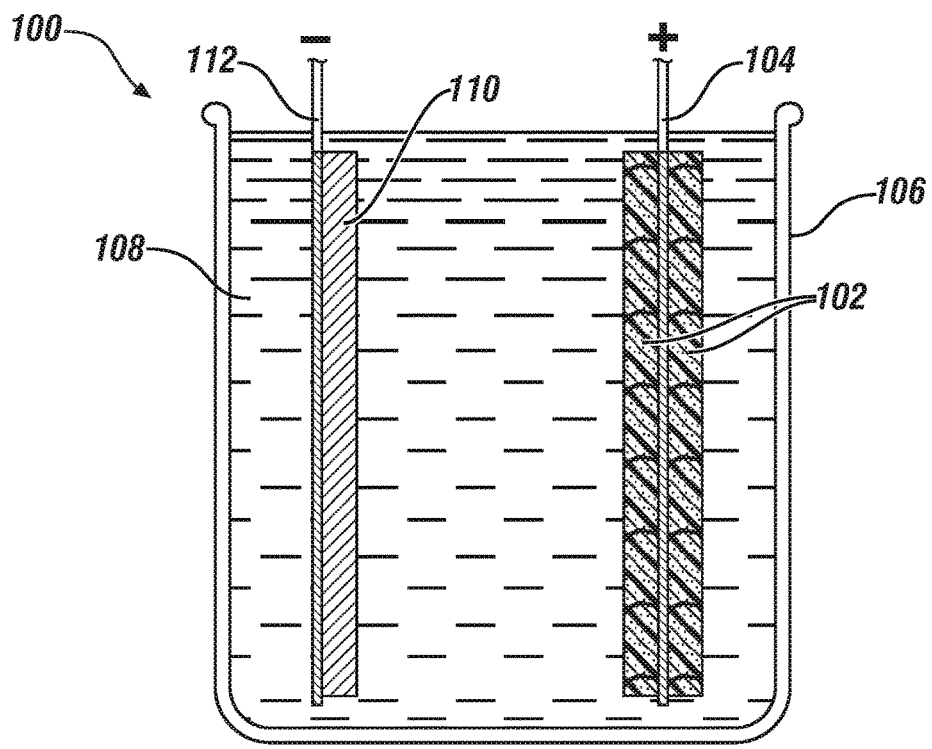

FIG. 2 is a schematic illustration of an assembly of a lithium plate bonded to a conductive metal layer and a newly formed graphite anode, formed of porous layers of graphite bonded to the faces of a copper foil current collector. The two members are shown placed in a container with a non-aqueous liquid electrolyte. This illustration is used in the description of related pre-lithiation methods described below in this specification.

Figure 3:
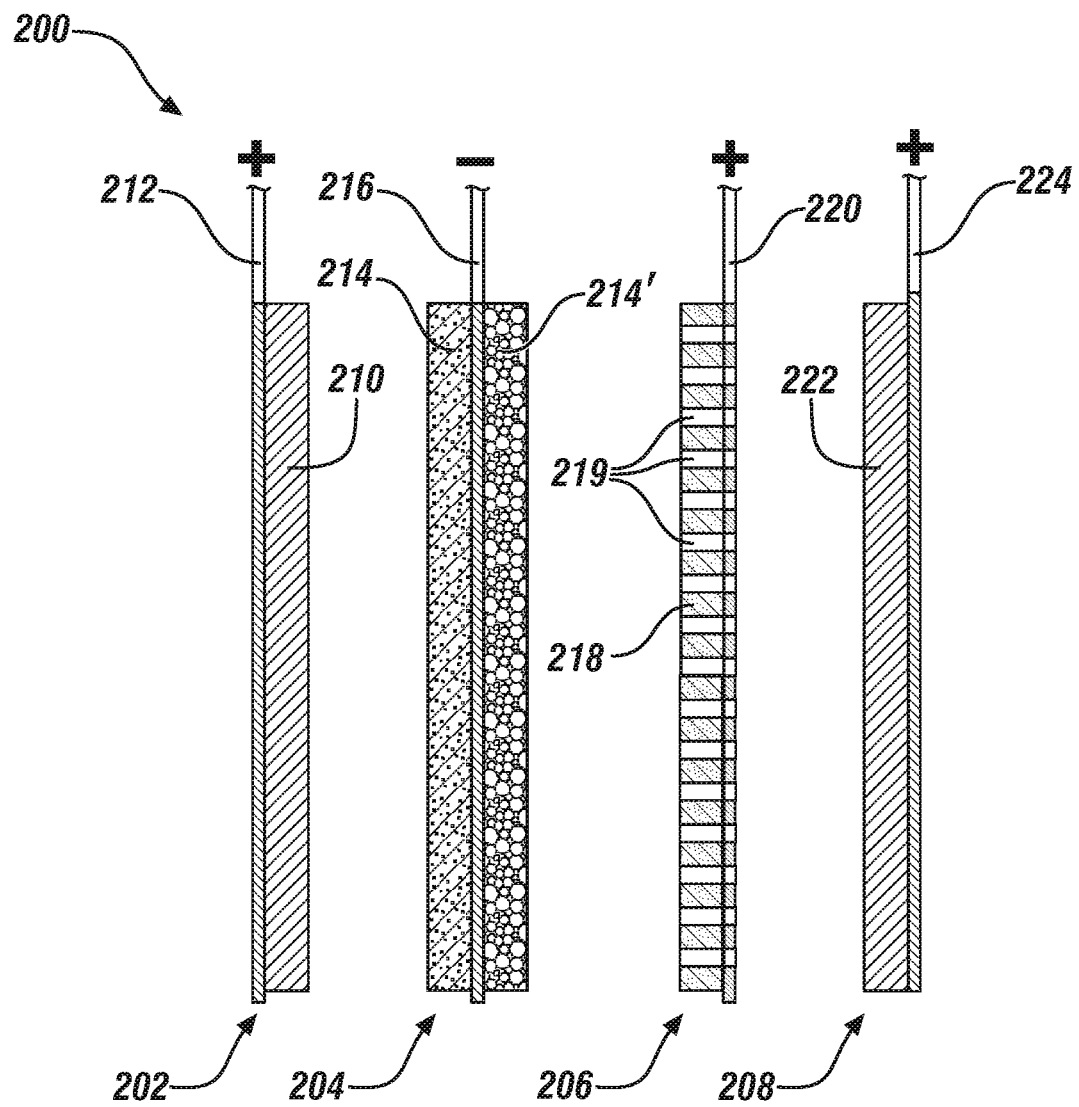

FIG. 3 is a schematic cross-sectional view of the side edges of an arrangement of electrode members used in another method of pre-lithiation of a newly formed graphite anode. A positively-charged (during cell discharge) lithium iron phosphate cathode and a through-hole containing, positively-charged activated carbon capacitor cathode are positioned on opposite sides of the negatively-charged graphite anode. And a sacrificial, positively-charged lithium iron phosphate cathode is positioned on the opposite side of the capacitor cathode. Not illustrated are separator members and the liquid non-aqueous electrolyte solution used in the operation of this cell. As described below in the specification, this pre-lithiation cell with its sacrificial lithium iron phosphate cathode, and its through-hole-containing, activated carbon capacitor cathode are used to pre-lithiate the newly-prepared graphite anode. As will be described below in this specification, following the lithiation process the sacrificial lithium iron phosphate electrode is disconnected from the now-lithiated graphite anode and, optionally, removed from the now functional cell in which the lithiated graphite anode is paired in opposition to the LFP cathode and the activated carbon capacitor cathode.

DESCRIPTION OF PREFERRED EMBODIMENTS

It is recognized that in a basic hybrid lithium battery/activated carbon capacitor, the forming cycles for graphite anodes may irreversibly consume a substantial portion of the available lithium ions from the non-aqueous electrolyte solution and from the adjacent lithium compound material in the cathode. Rather than modify the specified compositions of the activated carbon capacitor electrode and/or the lithium cathode material (e.g., lithium iron phosphate particles), practices are used in this specification to form pre-lithiated graphite anodes for use or assembly in the hybrid cell. Such graphite anode pre-lithiation processes are described for the preparation of a single basic hybrid cell. But it is to be understood that a battery/capacitor cell package may include more than one such hybrid cell and one or more lithium-ion battery cells. And the hybrid cell itself may be modified with respect to the porous layers of bonded electrode materials on one or both sides of a current collector foil used in the specific electrode.

FIG. 1 illustrates the four electrode members of a basic hybrid lithium-ion battery/lithium-ion capacitor cell 10 with three separators placed between the four electrodes. FIG. 1 illustrates a side edge view in cross-section of the cell members. In an assembled cell, the four electrodes and inter-placed separators would be like-shaped and sized and stacked against each other. For example, the electrodes and separators are often flat and rectangular (e.g., 50 mm by 55 mm) and less than a millimeter in thickness. But in the hybrid cell 10, illustrated in FIG. 1, the electrodes and separators are spaced-apart and illustrated from one edge side to enable an easier description of the compositional components and structures of the electrodes and their respective positions in the assembled cell.

Viewed from left-to-right in FIG. 1, hybrid cell 10 comprises a lithium iron phosphate cathode 12, a first graphite anode 14 (pre-lithiated on one side), an activated carbon capacitor cathode 16 and a second pre-lithiated graphite anode 18. Examples of procedures for the forming pre-lithiated graphite anodes are described below in this specification. Inserted between the respective electrodes are three like-shaped and formed separators 20, 20', and 20". This illustration of hybrid cell 10 is a non-limiting example of a representative basic hybrid cell. Other examples, may include different electrode configurations and electrode-coating practices, such as one-side or two-sided coatings of electrode materials on a current collector.

The lithium iron phosphate (sometimes LFP herein) cathode 12 is formed of a porous layer of micrometer-size particles of lithium iron phosphate 22, resin-bonded to one side of an aluminum current collector 24. The porous layer of lithium iron phosphate particles 22 may contain a minor portion of electrically conductive carbon particles. As illustrated in FIG. 1, the current collector 24 of the LFP cathode 12 is electrically connected to the current collector 34 of the activated carbon capacitor cathode (AC) 16. AC capacitor cathode 16 is formed of porous layers 32 of activated carbon particles which are resin-bonded to both major surfaces of the aluminum current collector 34. The metal foil electrical connection 40 joining LFP current collector 24 and the AC current collector 34 extends outside the container package (not illustrated) and is positively charged when hybrid cell 10 is being discharged.

Hybrid cell 10 also comprises a pair of electrically-connected pre-lithiated graphite anodes 14, 18. A first pre-lithiated graphite anode 14 is positioned between LFP cathode 12 and the AC capacitor 16. In this example, pre-lithiated graphite anode 14 is formed of one porous layer 26 of pre-lithiated micrometer-size graphite particles (which may contain a small portion of electrically conductive carbon particles) facing the AC capacitor cathode material layer 32, and one porous layer of graphite particles 28 (not pre-lithiated) facing the layer of active iron phosphate cathode material 22. Each of anode material layers 26, 28 is resin-bonded to opposing sides of a thin copper current collector 30. And the second pre-lithiated graphite anode 18 comprises a single porous layer of small graphite particles 38, resin-bonded to one side of a thin copper current collector 36. The single porous layer of pre-lithiated graphite anode material 38 (in this basic hybrid cell) is placed facing one side of the AC capacitor 16.

Each described layer of pre-lithiated anode material 26, 38 is characterized by the presence of a solid electrolyte interface (SEI) on surfaces of the original graphite particles in each porous layer of anode material. In each such pre-lithiated anode material layer (26, 38) the SEI provides a protective interface on the porous graphite particle anode layers, enabling the subsequent intercalation of lithium ions from the electrolyte and de-intercalation of lithium ions into the electrolyte during charging and discharging cycles of the hybrid cell.

The metal foil electrical connection 42 between copper current collectors 30, 36 extends outside the container (not illustrated) of the assembled cell and is negatively charged when hybrid cell 10 is being discharged.

When hybrid cell 10 is assembled and subjected to formation cycling, LFP layer 12 would lie against one side of separator 20 and one side of the plain (not-pre-lithiated) graphite anode material layer 28 of anode 14 would lie against the other side of separator 20. Similarly, separators 20' and 20" lie against surfaces of pre-lithiated graphite anodes 26, 38 and the AC capacitor active material layers 32 as illustrated in FIG. 1. After hybrid cell 10 has been placed in a suitable container, the pores of each electrode 12, 14, 16, 18 and separators 20, 20', 20" would be carefully infiltrated with a selected non-aqueous liquid electrolyte which is not illustrated in FIG. 1. Electrical connectors 40, 42 for hybrid cell 10 would extend outside of the closed container enclosing the hybrid cell 10 and any additional cells to be combined with it.

It is to be understood that hybrid cell 10, illustrated in FIG. 1, is a basic cell unit. In many assembled battery/capacitor electrochemical cells, this basic hybrid cell unit 10 may be repeated as a hybrid cell unit and combined with additional battery cell units in order to achieve a desired combination of battery properties and capacitor properties.

The pre-lithiation of preformed graphite anode layers (such as layers 26, 38 in FIG. 1) may be accomplished using any of a number of suitable processes. In general, such pre-lithiation methods start with a preformed graphite anode with a porous layer of micrometer size graphite particles bonded to one or both sides of a suitable current collector foil. The graphite particles may be mixed with a small amount of conductive carbon particles prior to bonding to the surface(s) of the current collector foil. The single-side thicknesses of bonded porous graphite layer are typically up to about 200 micrometers.

The following pre-lithiation processes may be applied to a preformed anode, which is characterized by a porous layer of graphite particles bonded to one or both sides of a suitable current collector, often a copper current collector foil. And in selected examples, the process may be applied selectively to one side or both sides of a two-side coated graphite anode. In general, the pre-lithiation process comprises bringing a source of lithium ions into contact with the selected side or sides of the preformed graphite anode in a manner that forms a suitable solid electrolyte layer on intended particles of the graphite anode material.

In a first example, a predetermined amount of stabilized lithium metal particles (SLMP) in the form of a powder is carefully applied by, for example, brushing onto the porous graphite anode material on a surface of a current collector foil and then suitably pressing the lithium particles against the porous graphite anode material. The lithium powder-coated graphite anode is then assembled into a hybrid cell with a lithium compound cathode and capacitor cathode, and separators. The assembly is placed in an intended cell container. A suitable non-aqueous electrolyte as added to the assembled electrodes and separators. For example, the electrolyte solution may be a 1.2 M solution of $LiPF_6$ dissolved in EC:DMC:EMC=1:1:2. The cell can be rested with the immersed electrodes at open circuit. Activation of the lithium powder (SLMP) and formation of the SEI occur spontaneously. The predetermined amount of lithium powder is suitably consumed in the lithiation process. This process may be conducted, for example, at a normal room temperature of 20-30° C. Such pre-lithiated graphite anodes may, for example, serve as anodes 14, 18 in the hybrid cell 10 illustrated in FIG. 1.

There are a few related electrochemical processes for forming pre-lithiated graphite anodes using a thin plate of lithium generally corresponding in size and shape with a pre-formed graphite anode.

For example, in FIG. 2, an illustrative setup 100 uses a suitable container 106 in pre-lithiation practices. As will be described, the container may take a variety of shapes and serve additional functions.

A graphite anode, preformed with a porous layer of graphite particles 102 bonded to both major surfaces of a copper current collector foil 104 is placed and supported upright in a container 106 of a $LiPF_6$ (for example) electrolyte solution 108. Also suspended in closely spaced, parallel alignment is a like-shaped lithium metal plate 110. Lithium plate 110 is illustrated as being carried on a supporting member 112, which may be an electrically conductive copper foil. However, in some practices the lithium plate 110 may not require a supporting member or an additional electrical connection. And in some practices, the container 106 may be, for example, the pouch or coin in which the finished hybrid cell is to be used. The spacing between a graphite anode layer 102 and lithium metal plate 110, as well as the amount of electrolyte solution 108 are exaggerated for purposes of illustration. In some of the following lithiation practices, a separator(s), not illustrated in FIG. 2, may be placed between the lithium plate and the graphite anode.

In a first method utilizing the liquid electrolyte 108 and the lithium metal plate 110, the pre-lithiation process occurs by galvanostatic charging of the inherently positively charged graphite anode layer(s) 102 and the negatively-charged lithium plate 110 in the $LiPF_6$ electrolyte solution 108. In this galvanostatic process, lithium cations supplied from lithium plate 110 enter the electrolyte solution 108 and migrate through the electrolyte solution to the porous layers of graphite anode material 102 on current collector 104. Optionally, a suitable low charging current may be used to enhance the formation of a suitable SEI. Lithium cations and non-aqueous solvent molecules interact with the graphite anode layers 102 to form the desired SEI coating on the graphite anode layers. The amount of lithium that is incorporated into the graphite anode material may be controlled by the duration of the charging time.

In other pre-lithiation processes for graphite anodes, electrode materials other than lithium plates may be used. For example, cathode electrode materials such as lithium manganese oxide, lithium iron phosphate, lithium nickel cobalt manganese oxide, and/or lithium nickel cobalt aluminum oxide may be used.

Obviously, a pre-determined number of graphite anodes and a suitable number of suitably placed lithium plates may be processed in a moisture-free, electrolyte-containing vessel or container. At the completion of this pre-lithiation process, the original porous graphite layers are pre-lithiated (no longer 102) and the pre-lithiated anodes are removed from the container or cell and are available for further use. For example. they are drained and dried and are ready for assembly in a hybrid lithium battery/activated carbon capacitor cell such as, for example, the cell 10 illustrated in FIG. 1.

In a second method (still referring to FIG. 2), a graphite anode with porous graphite layers 102 and a lithium metal plate 110 may be placed in a suitable container 106 of liquid electrolyte 108. In this method an electrical connection (for example, a short circuit using an electric wire), not specifically illustrated in FIG. 2, is made, for example, between the current collector 104 carrying the porous graphite anode layers 102 and an electrically conductive member 112 to which the lithium plate 110 is attached. In this short-circuit process, lithium cations supplied from lithium plate 110 enter the electrolyte solution 108 and migrate through the electrolyte solution to the porous layers of graphite anode material 102 on current collector 104. In this method, the short-circuit connection between graphite anode 102 and lithium plate 110 or its supporting member 112 (e.g., a copper current collector) enhances the pre-lithiation process. Apart from the short circuit connection, the lithium plate 110 and porous graphite anode layer 102 are not in physical contact. They are supported in a closely spaced-apart assembly in the electrolyte 108, or a porous polymeric separator layer (not illustrated in FIG. 2) may be placed between the facing surfaces of the lithium plate 110 and a porous layer of anode material 102. Lithium cations and non-aqueous solvent molecules interact with the graphite anode layers 102 to form the desired SEI coating on the graphite anode layers.

In yet another related pre-lithiation method for graphite anodes 100, a side of a lithium plate (such as 110 in FIG. 2) may be placed against one (or both) of porous layers 102 of graphite anode material bonded to a copper current collector 104. Again, the use of a support member or electrical connector 112 may not be required in this embodiment. The touching members 112, 102 (no separator required) are immersed in a lithium cation conducting electrolyte 108 in a suitable container 106. And, alternatively, with a suitably small amount of electrolyte, no container 106 may be required. The pre-lithiation process could be conducted in an oxygen/water-free environment such as a glove-box. Again, in this process, lithium cations supplied from the lithium plate 110 enter the electrolyte solution 108 and migrate through the electrolyte solution to the porous layers of graphite anode material 102 on current collector 104. This direct contact method provides rapid and controllable (by contact time) pre-lithiation of the porous layer(s) of graphite 102 due to the formation of an almost zero-gap between the graphite layer(s) 102 and the lithium metal plate (s) 110.

The above-described methods describe easy-to-perform methods of using disposable lithium plates and lithium electrolyte solutions to pre-lithiate newly made graphite anodes before they are assembled in a hybrid cell. Obviously, in the selection of one of the pre-described pre-lithiation methods, the selection of a container configuration (if a container is actually required) and electrolyte containment is adapted to process a number of graphite anodes (or graphite anode layers) requiring the formation of the solid electrolyte interface in the porous graphite anode layers.

FIG. 3 is a schematic outline illustration of a pre-lithiation cell 200, comprising a positively-charged, lithium iron phosphate (LFP) cathode 202, a newly made, negatively-charged, graphite anode 204, a positively-charged activated carbon (AC) capacitor cathode 206 with through-holes formed through the capacitor material and its current collector, and a positively-charged sacrificial, lithium ion source, lithium iron phosphate (LFP) cathode 208. Not illustrated are porous separators placed (like those illustrated in FIG. 1) between the closely-spaced electrodes of the cell 200 nor an $LiPF_6$ electrolyte solution infiltrated into the pores of the electrode materials and the pores of the separators.

As in FIG. 1, FIG. 3 illustrates a side edge view in cross-section of the cell members. In an assembled cell, the four electrodes and inter-placed separators (not illustrated) would be like-shaped and sized and stacked against each other. For example, the electrodes and separators are often flat and rectangular (e.g., 50 mm by 55 mm) and less than a millimeter in thickness. But in the hybrid cell 200, illustrated in FIG. 3, the electrodes are spaced-apart and illustrated from one edge side to enable an easier description of the components and structures of the electrodes and their respective positions in the assembled cell.

LFP cathode 202 is formed of a porous layer of lithium iron phosphate particles 210 resin-bonded to an aluminum foil current collector 212.

Graphite anode 204 is formed of a porous layer of graphite particles 214 bonded to each side of a copper foil current collector 216. In FIG. 3, the graphite anode 204 is illustrated with a porous layer of new graphite particles 214 bonded to the left side if its current collector 216, and with a porous layer of lithiated (SEI-containing) graphite particles 214' on the right side of current collector 216. Thus, the illustration of the SEI-containing graphite particle anode layer 214' depicts the anode layer at the completion of the lithiation process. At the beginning of the pre-lithiation process, both anode layers of graphite particles would resemble layer 214.

The AC capacitor cathode 206 is formed of a porous layer of activated carbon 218 bonded to one side of an aluminum or copper current collector foil 220. The AC capacitor cathode 206 is further characterized by the presence of many micro-diameter holes (indicated schematically at 219 extending through the current collector foil 220 and porous layer of activated carbon 218. The straight through-holes are distributed generally uniformly over the principal surfaces of the AC capacitor cathode 206. Alternatively, the AC capacitor 206 may be formed of a meshed current collector carrying the porous layer of activated carbon, which then would not require through-holes. And the sacrificial LFP cathode 208 is formed of a porous layer of LFP particles 222 resin-bonded to an aluminum foil current collector.

A pre-lithiation of the graphite layer 214' of the graphite anode 204 facing the activated carbon capacitor cathode 206 is then performed. The graphite anode 204 (then positively charged) is temporarily electrically with the sacrificial LFP cathode 208 (then negatively charged) such that lithium ions are de-intercalated from the LFP layer 222 into the lithium-ion containing electrolyte (not illustrated) and transported through the electrolyte, through the holes 219 in the inactive AC capacitor electrode 206 and into and onto the graphite layer 214' facing the AC capacitor electrode. The combination of lithium ions and solvent molecules interact with the graphite particles to form the desired and necessary solid electrolyte interface on graphite anode material layer 214' subjected to such pre-lithiation processing. Current flow and lithium ion transport conducted during this pre-lithiation is continued for a pre-determined period of time to suitably form a solid electrolyte interface on graphite anode layer 214'. The graphite layer 214 on the left side of anode 204 is not intentionally affected by the pre-lithiation step. The left-side graphite layer 214 will be readily lithiated by LFP cathode 202 during subsequent formation cycling of cell 200.

At the completion of this pre-lithiation process, the sacrificial LFP electrode 208 is disconnected from the now-lithiated graphite anode 204. The right-side (FIG. 3) original layer 214 of graphite anode 204 is now lithiated (214') like graphite layers 26, 38 on anodes 14, 18, illustrated in FIG. 1. The sacrificial LFP electrode 208 may be left dis-connected in the cell 200 or removed from the cell. The lithiated graphite anode 204 is now ready for electrochemical-pairing with oppositely charged LFP and AC electrodes for charging and discharging in the operation of a hybrid cell.

It may be desired to determine or estimate when the lithiation of the graphite anode material and the formation of a suitable SEI has been accomplished. In general, it is recognized that the SEI formation of graphite will generally involve around ten percent of the graphite capacity. Based on this principle, it is suggested that the pre-lithiation of graphite in this practice should take at least ten percent of the graphite capacity, and a facile analysis for a specific graphite anode application may be used to determine a suitable pre-lithiation time, SLMP amount, or other parameters for the formation of an effective SEI in a specific graphite anode structure.

Referring again to FIGS. 1 and 3, it is to be understood that hybrid cell 10 and hybrid cell 200, are basic hybrid cell units. In many assembled battery/capacitor electrochemical cells, such basic cell units may be repeated as a hybrid cell unit and/or combined with additional battery cell units in order to achieve a desired combination of battery properties and capacitor properties.

In the above example, particles of lithium iron phosphate (LiFePO$_4$) were used as the active material for the cathode. Other non-limiting examples of suitable cathode materials for the hybrid cell include particles of lithium manganese oxide (LiMn$_2$O$_4$), particles of a lithium manganese cobalt oxide (LiNi$_{(1-x-y)}$Co$_x$Mn$_y$O$_2$), and/or particles of a lithium nickel cobalt aluminum oxide (LiNi$_{(1-x-y)}$Co$_x$Al$_y$O$_2$). As stated, the particles of electrode material may be mixed with small particles of electrical-conductivity enhancing carbon particles or the like.

As stated above in this specification, it is also recognized that other anode compositions for hybrid lithium-ion battery/capacitor cells may also benefit from pre-lithiation practices described in this specification. Such anode material compositions include particles of silicon (Si), silicon mixed with graphite, suitable carbon particles (soft carbon, hard carbon and the like), silicon oxides (SiO$_x$, 0<x<2), transition metals (e.g., tin), metal oxides such as SnO$_2$ and TiO$_2$, and other suitable lithium-accepting anode materials. Such materials have been used or considered for use as anode materials for lithium-ion cells and have benefited from or required lithi-ation as an initial process in a newly assembled cell.

In a hybrid cell, the particles of active electrode material typically have a largest dimension in the range of about 0.05 to 30 micrometers and they are bonded as a porous electrode layer to one or both sides of a suitable metallic current collector foil (typically aluminum or copper) having a thickness in the range of about 4 to 25 micrometers and a two-dimensional coated-area shape of the intended electrode. The current collector foil typically has an uncoated tab, or the like, of a size and shape for electrical connection of its electrode to other electrodes in the assembled cell.

In general, the activated carbon capacitor particles, the graphite anode particles, or the selected lithium-ion cell cathode particles are coated or otherwise suitably mixed with a suitable amount of bonding material for formation of the porous electrode layer on one or both surfaces of a current collector foil. For example, the particles may be dispersed or slurried with a solution of a suitable resin, such as polyvinylidene difluoride dissolved in N-methyl-2-pyr-rolidone and spread and applied to a surface of current collector in a porous layer. Other suitable binder resins include carboxymethyl cellulose/styrene butadiene rubber resins (CMC/SBR) or polytetrafluoroethylene (PTFE). The binders are typically not electrically conductive and should be used in a minimal amount to obtain a durable coating layer of porous electrode material on the current collector surface without fully covering the surfaces of the particles of electrode material.

In many battery constructions, the separator material is a porous layer of a polyolefin, such as polyethylene (PE), polypropylene (PP), non-woven, cellulose/acryl fibers, cel-lulose/polyester fibers, or glass fibers. Often the thermoplastic material comprises inter-bonded, randomly oriented fibers of PE or PP. The fiber surfaces of the separator may be coated with particles of alumina, or other insulator material, to improve the safety of batteries, while retaining the porosity of the separator layer for infiltration with liquid electrolyte and transport of lithium ions between the cell electrodes. The separator layer is used to prevent direct electrical contact between the facing negative and positive electrode material layers and is shaped and sized to serve this function. In the assembly of the cell, the facing major faces of the electrode material layers are pressed against the major area faces of the separator membrane. A liquid electrolyte is infiltrated or injected into the pores of the separator and electrode material particulate layers.

The electrolyte for a subject hybrid lithium-ion battery/capacitor cell may be a lithium salt dissolved in one or more organic liquid solvents. Examples of suitable salts include lithium hexafluorophosphate (LiPF$_6$), lithium tetrafluorobo-rate (LiBF$_4$), lithium perchlorate (LiClO$_4$), lithium hexafluoroarsenate (LiAsF$_6$), and lithium trifluoroethanesulfonimide. Some examples of solvents that may be used to dissolve the electrolyte salt include ethylene carbonate (EC), dimethyl carbonate (DMC), methylethyl carbonate (EMC), and propylene carbonate (PC). There are other lithium salts that may be used and other solvents. But a combination of lithium salt and solvent is selected for providing suitable mobility and transport of lithium ions in the operation of the hybrid cell with its battery and capacitor electrode combinations. The electrolyte is carefully dispersed into and between closely spaced layers of the electrode elements and separator layers.

In addition to the electrolyte salt(s) and non-aqueous solvent(s), suitably small portions of other additives may be included in the electrolyte solution. For example, it may be desired to add one or more of vinylene carbonate (VC), fluoroethylene carbonate (FEC), or lithium bis(oxolato) borate (LiBOB) to enhance the formation of the solid electrolyte interface on the graphite particles of the anode. It may be desired to add N, N-diethylamino trimethyl silane as a cathode protection agent. Tris (2,2,2-trifluoroethyl) phosphate may be added as stabilizer for $LiPF_6$ electrolyte salt. Further, a suitable additive as a safety protection agent and/or as a lithium deposition improver may be added.

This invention has been illustrated with some examples of preferred embodiments. But such illustrative examples are not intended to be limiting of the scope of the invention.

The invention claimed is:

1. A hybrid lithium-ion battery/capacitor electrochemical cell comprising an assembly of (i) an anode formed of one or more porous layers of particles of an anode material, (ii) a cathode formed of a porous layer of particles of a lithium compound, (iii) the cathode electrically-connected to a capacitor electrode formed of a porous layer of particles of activated carbon, the anode being placed between the cathode and the capacitor electrode, (iv) one or more porous separators physically separating the anode, cathode, and capacitor electrode in a closely-spaced assembly, and (v) a non-aqueous liquid electrolyte, conductive of lithium cations and compatible anions, infiltrating the porous layers of each of the anode, cathode, and capacitor electrode and the porous separators to permit the transport of lithium cations and the compatible anions to and from each of the porous layers of each of the anode, cathode, and capacitor electrode as the electrochemical cell is being charged and discharged;

the anode being characterized by the presence of a first porous layer of the one or more porous layers of anode material particles bonded to a first side of a metal foil current collector and a second porous layer of the one or more porous layers of anode material particles bonded to a second side of the metal foil current collector, one of the first porous layer and the second porous layer faces the porous layer of the capacitor electrode with only a first porous separator of the one or more porous separators between the one of the first porous layer and the second porous layer and the capacitor electrode, only the one of the first porous layer and the second porous layer having been pre-lithiated to form a solid electrolyte interface on the one of the first porous layer and the second porous layer either (i) prior to the anode being placed in the assembly, (ii) the one of the first porous layer and the second porous layer having been coated with particles of lithium metal, which are wetted by the liquid electrolyte in the electrochemical cell, and thereby lithiate the anode material to form a solid electrolyte interface when the electrochemical cell is first activated, or (iii) after the anode is placed in the assembly.

2. A hybrid lithium-ion battery/capacitor electrochemical cell as stated in claim 1 in which the one of the first porous layer and the second porous layer has been pre-lithiated to form the solid electrolyte layer by an electrochemical reaction with lithium metal and then placed in the assembly.

3. A hybrid lithium-ion battery/capacitor electrochemical cell as stated in claim 1 in which the assembly further comprises a sacrificial electrode, the sacrificial electrode formed of particles of a lithium compound cathode material and placed on an opposite side of the capacitor electrode away from the anode, where the sacrificial electrode was temporarily connected with the anode to pre-lithiate to form the solid electrolyte layer prior to interconnection of the cathode and anode and subsequent activation of the cell.

4. A hybrid lithium-ion battery/capacitor electrochemical cell as stated in claim 3 in which the sacrificial electrode remains in the cell following formation of the solid electrolyte layer and activation of the cell.

5. A hybrid lithium-ion battery/capacitor electrochemical cell as stated in claim 1 in which the anode material comprises graphite particles.

6. A hybrid lithium-ion battery/capacitor electrochemical cell as stated in claim 1 in which the anode material comprises at least one of silicon, silicon mixed with graphite, soft carbon, hard carbon, a silicon oxide ($SiO_x$, $0<x<2$), tin, tin dioxide, and titanium dioxide.

7. A hybrid lithium-ion battery/capacitor electrochemical cell comprising an assembly of (i) a group of two electrically connected anodes formed of one or more porous layers of graphite particles, (ii) a cathode formed of a porous layer of particles of a lithium compound, (iii) the cathode electrically-connected to a capacitor electrode formed of a porous layer of particles of activated carbon, the capacitor electrode being placed between the anodes with the cathode facing one of the anodes, (iv) one or more porous separators physically separating the anodes, cathode, and capacitor electrode in a closely-spaced assembly, and (v) a non-aqueous liquid electrolyte, conductive of lithium cations and compatible anions, infiltrating the porous layers of each of the anodes, cathode, and capacitor electrode and the porous separators to permit the transport of lithium cations and the compatible anions to and from each of the porous layers of each of the anodes, cathode, and capacitor electrode as the electrochemical cell is being charged and discharged;

each of the two electrically-connected anodes being characterized by the presence of the one or more porous layers of graphite particles bonded to one or more sides of a metal foil current collector, one of the one or more porous layers of graphite particles faces the porous layer of the capacitor electrode with only a first porous separator of the one or more porous separators between the one of the one or more porous layers and the capacitor electrode, only the one of the one or more porous layers having been pre-lithiated to form a solid electrolyte interface on the one of the one or more porous layers prior to the anodes being placed in the assembly.

8. A hybrid lithium-ion battery/capacitor electrochemical cell as stated in claim 7 in which the one of the one or more porous layers of each of the two electrically-connected anodes has been pre-lithiated by applying powder particles of lithium metal to the graphite and then being placed in the assembly, the lithium metal activated to form the solid electrolyte interface layer.

9. A hybrid lithium-ion battery/capacitor electrochemical cell as stated in claim 7 in which the one of the one or more porous layers of each of the two electrically-connected anodes is pre-lithiated to form the solid electrolyte interface by galvanostatic charging using a lithium electrode and a non-aqueous lithium electrolyte solution.

10. A hybrid lithium-ion battery/capacitor electrochemical cell as stated in claim 7 in which the one of the one or more porous layers of each of the two electrically-connected anodes is pre-lithiated to form the solid electrolyte interface using a short-circuit electrical connection with a lithium electrode, wherein the one of the one or more porous layers and the lithium electrode are disposed in a non-aqueous lithium electrolyte solution.

11. A hybrid lithium-ion battery/capacitor electrochemical cell as stated in claim 7 in which the one of the one or more porous layers of each of the two electrically-connected anodes is pre-lithiated to form the solid electrolyte interface by placement of the one of the one or more porous layers in face-to-face contact with a plate of lithium metal in a non-aqueous lithium electrolyte solution, the lithium metal activated to form the solid electrolyte interface layer.

12. A method of assembling a hybrid lithium-ion battery/capacitor comprising an assembly of (i) an anode formed of one or more porous layers of an anode material that does not initially contain lithium, (ii) a cathode formed of a porous layer of particles of a lithium compound, (iii) the cathode electrically-connected to a capacitor electrode formed of a porous layer of particles of activated carbon, the anode electrode being placed between the cathode and the capacitor electrode, (iv) one or more porous separators physically separating the anode, cathode, and capacitor electrode in a closely-spaced assembly, and (v) a non-aqueous liquid electrolyte, conductive of lithium cations and compatible anions, infiltrating the porous layers of each of the anode, cathode, and capacitor electrode and the porous separators to permit the transport of lithium cations and the compatible anions to and from each of the porous layers of each of the anode, cathode, and capacitor electrode as the electrochemical cell is being charged and discharged;

the anode being characterized by the presence of a first porous layer of the one or more porous layers of anode material particles bonded to a first side a metal foil current collector and a second porous layer of the one or more porous layers of anode material particles bonded to a second side of the metal foil current collector, one of the first porous layer and the second porous layer faces the porous layer of the capacitor electrode with only a first porous separator of the one or more porous separators between the one of the first porous layer and the second porous layer and the capacitor electrode: the method comprising:

forming a pre-lithiated solid electrolyte interface only on the one of the first porous layer and the second porous layer either (i) prior to the placement of the anode in the cell, or (ii) by applying a coating of particles of lithium metal on the one of the first porous layer and the second porous layer prior to the placement of the anode in the cell with the electrolyte and permitting the electrolyte to wet the lithium particles in the applied coating prior to charging and discharging of the hybrid cell.

13. A method of assembling a hybrid lithium-ion battery/capacitor as stated in claim 12, the method comprising subjecting the one of the first porous layer and the second porous layer to an electrochemical reaction with lithium metal and a non-aqueous liquid electrolyte, conductive of lithium cations, to form the solid electrolyte interface on the anode material particles of the anode, and then placing the anode in the assembly of cell members.

14. A method of assembling a hybrid lithium-ion battery/capacitor as stated in claim 12 in which the anode material comprises graphite particles.

15. A method of assembling a hybrid lithium-ion battery/capacitor as stated in claim 12 in which the anode material comprises at least one of silicon, silicon mixed with graphite, soft carbon, hard carbon, a silicon oxide ($SiO_x$, $0<x<2$), tin, tin dioxide, and titanium dioxide.

* * * * *